Figure 3:
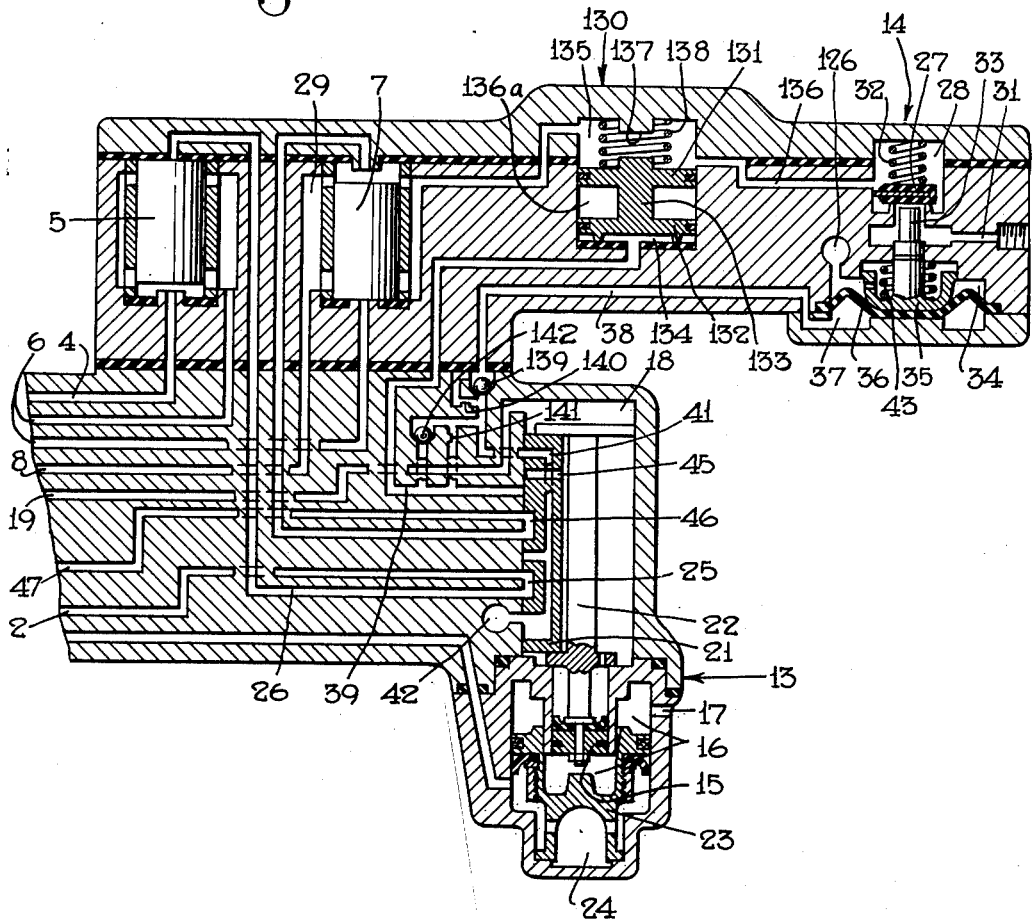

May 5, 1953
A. T. GORMAN
2,637,601
FLUID PRESSURE BRAKE APPARATUS
Filed Aug. 22, 1950
2 SHEETS—SHEET 1
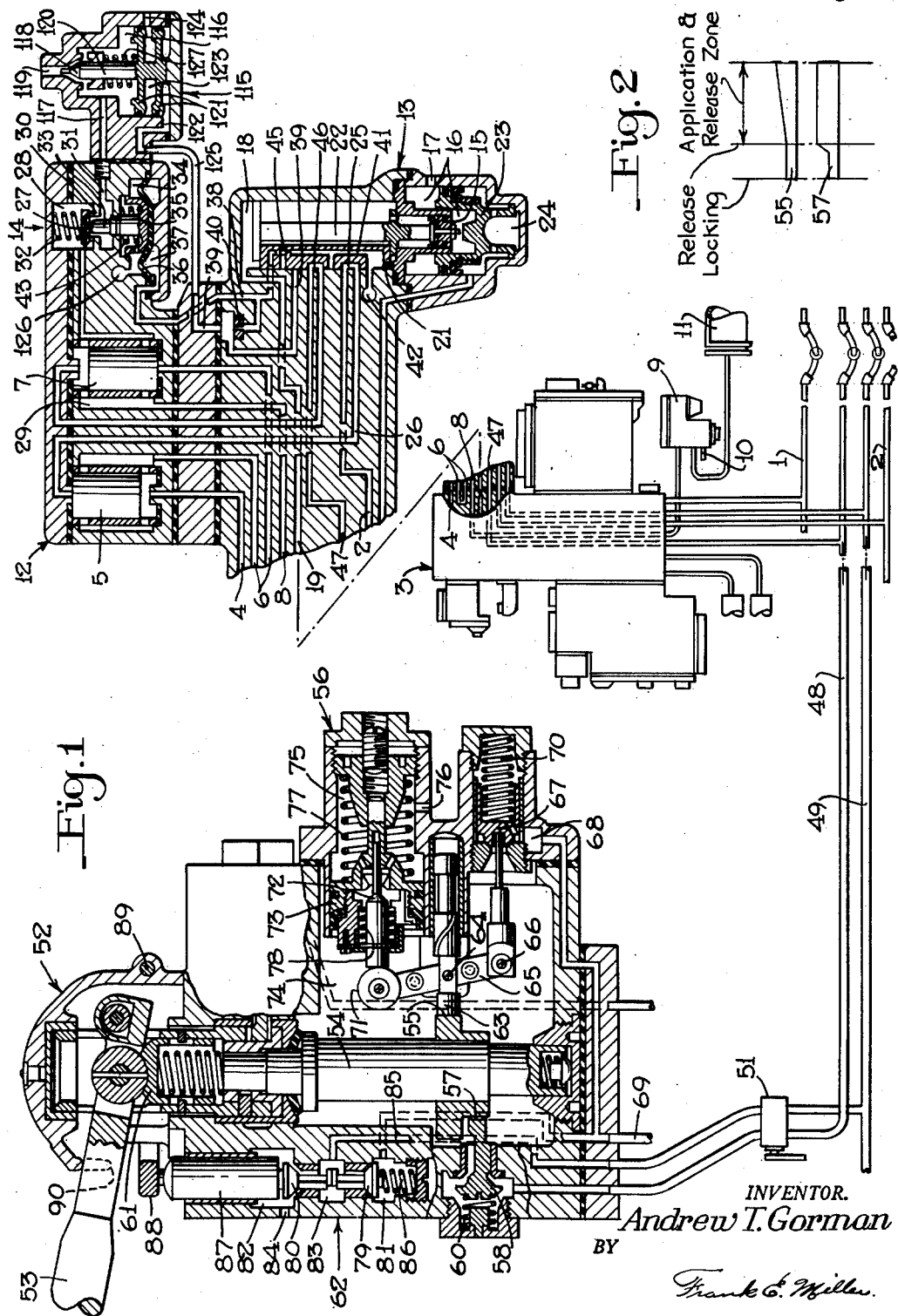
INVENTOR.
Andrew T. Gorman
BY
Frank E. Miller.
ATTORNEY May 5, 1953    A. T. GORMAN    2,637,601
FLUID PRESSURE BRAKE APPARATUS
Filed Aug. 22, 1950    2 SHEETS—SHEET 2

INVENTOR.
Andrew T. Gorman
BY
Frank E. Miller
ATTORNEY

Patented May 5, 1953

2,637,601

UNITED STATES PATENT OFFICE 2,637,601

FLUID PRESSURE BRAKE APPARATUS

Andrew T. Gorman, Pitcairn, Pa., assignor to Westinghouse Air Brake Company, a corporation of Pennsylvania Application August 22, 1950, Serial No. 180,787

14 Claims. (Cl. 303—26)

This invention relates to fluid pressure brake apparatus and more particularly to the type for use on railway locomotives.

In the Westinghouse Air Brake Company's Instruction Pamphlet No. 5066 dated March 1948 there is disclosed a fluid pressure brake equipment particularly adapted for use on present day Diesel locomotives made up of a multiple of connected units usually including like end A units and one or more like intermediate B units. This equipment comprises pneumatic and electro-pneumatic brake control means on each unit both of which means are arranged for selective control by an engineer's automatic brake valve device on the lead unit of the locomotive to apply and release the locomotive brakes along with application and release of brakes on cars of a connected train, the pneumatic brake control means being controlled through a brake pipe and the electro-pneumatic brake control means through train wires and a straight air pipe, said wires and pipes being adapted to extend through the train.

On the lead locomotive there is also provided an engineer's independent brake valve device and associated with the pneumatic brake control means on each unit is an interlock valve portion comprising a selector valve device controlled by said brake valve device through the medium of an actuating pipe, and an independent release valve device controlled by said selector valve device.

The independent brake valve device comprises a handle having a brake release position for opening an independent application and release pipe to atmosphere and is movable from said position into an application and release zone for providing fluid in said pipe at a pressure proportional to the extent of movement from said release position, the maximum pressure which can thus be provided in said pipe being about forty-five pounds. The handle is depressible in the release position, as well as in any position in the application and release zone, for supplying fluid under pressure to an actuating pipe which pipe is vented in an elevated position of said handle which it will assume upon relief of manual pressure.

The independent release valve device comprises a flexible diaphragm which upon supply of fluid under pressure to one side is adapted to open a release valve for releasing the brakes on the respective locomotive unit. Upon supply of fluid to the opposite side of the diaphragm to within about eighteen pounds of that acting on the one side or upon release of fluid under pressure from both sides, the release valve is adapted to close.

The selector valve device assumes a normal position upon venting the actuating pipe for equalizing the fluid pressure on opposite sides of the diaphragm of the independent release valve device so that the release valve will close to permit application of the brakes on the locomotive unit by either the pneumatic or electro-pneumatic brake control means. Also in this position a communication is established to the application and release pipe to permit the brakes on the locomotive unit to be controlled from the independent brake valve device by movement of the handle thereof to its release position or into its application and release zone.

Upon supply of fluid under pressure to the actuating pipe the selector valve device assumes an independent release position for quickly supplying fluid under pressure from the main reservoir on the locomotive to the one side of the diaphragm of the independent release valve device to cause said diaphragm to deflect to open the release valve for releasing brakes on the locomotive unit. Also in this independent release position the opposite side of the diaphragm is opened to the application and release pipe and fluid under pressure is supplied to both from the main reservoir at a slower rate. In case the independent brake valve handle is in a depressed locking position closing off the application and release pipe to atmosphere, the slow supply of fluid under pressure to the application and release pipe is intended to increase the pressure therein and on the connected side of the diaphragm to that acting on the opposite side and permit closure of the release valve after a time period sufficient to ensure a complete release of locomotive brakes. The purpose of the locking position is to prevent an electro-pneumatic application of brakes on the locomotive when such an application is effected on the cars of a connected train.

In case an automatic or an electro-pneumatic application of brakes is in effect on the locomotive and cars of a train and the engineer desires to reduce the degree of brake application on the locomotive independently of the brake application on the train he will depress his independent brake valve handle and may move it into the application and release zone to a position corresponding to the degree of reduced brake application which it is desired to provide. In response to this operation of the independent brake valve handle the selector valve device will move to its independent release position for supplying fluid at main reservoir pressure to the one side of the diaphragm in the independent release valve for operating same to release the locomotive brakes. At the same time fluid under pressure will be supplied to the opposite side of the diaphragm and to the application and release pipe from the main reservoir at a slow rate as above mentioned and also fluid will be supplied to said pipe from the independent brake valve device, assuming the brake valve device handle is in the application and release zone, but the pressure thus obtained can not exceed that corresponding to the position of the brake valve handle, since the brake valve device is of the self-lapping type and will dissipate all excess pressure. Thus the pressure supplied to the application and release pipe and acting on the connected side of the diaphragm can never exceed the maximum (forty-five pounds) which it is possible to obtain from the brake valve device, and will therefore be less than main reservoir pressure acting on the opposite side of the diaphragm so the release valve will remain open and permit a complete release of brakes if the independent brake valve handle is held depressed for a sufficient period of time.

Now to reapply the locomotive brakes to the reduced degree which it is desired to retain it is necessary for the engineer to permit the handle to return to its elevated position to cause operation of the selector valve device to effect closure of the independent release valve and for opening the application and release pipe to the brake applying means on the locomotive, whereupon fluid at the pressure supplied by the brake valve device will become effective to reapply the locomotive brakes to the desired degree.

It will now be seen that moving the independent brake valve handle into the application and release zone at the time of depressing thereof is substantially valueless since the brakes will fully release in response to depression of the brake valve handle and in order to reapply them to the desired reduced degree said handle must be returned to its elevated position.

When the engineer merely desires to reduce the degree of a brake application on the locomotive independently of the brake application on cars of a connected train it is undesired that the locomotive brakes be fully released and then reapplied to the desired reduced degree because upon such release of brakes the locomotive will tend to surge forward and upon reapplication the locomotive will tend to buck the train resulting in rough handling of the train. In contrast, it is desirable that the engineer merely move the independent brake valve handle into the application and release zone to a position corresponding to the degree of brake application which he desires to retain and at the same time depress said handle, in response to which operation the brakes on the locomotive will merely reduce to the degree corresponding to the position of said handle, and one object of the invention is the provision of means for accomplishing this result in the 24RL locomotive brake equipment above referred to.

As above mentioned, the independent brake valve handle has a locking position for preventing an electro-pneumatic application of brakes on the locomotive when such an application is effected on cars of a train. In case of an emergency reduction in pressure in the brake pipe due, for example, to a rupture of the brake pipe or a connecting hose, it is desirable, however, that an automatic application of the brakes on the locomotive occur even if the brake valve handle is in locking position.

As before mentioned, when the independent brake valve handle is in locking position fluid under pressure is supplied to the actuating pipe while the application and release pipe is disconnected from atmosphere. As a result, the selector valve device will be in the position for supplying fluid under pressure from the main reservoir on the locomotive to the one side of the diaphragm of the independent release valve at a relatively fast rate to open the release valve and to the opposite side and connected application and release pipe at a slower rate. The fluid pressure thus provided on the opposite side of the diaphragm acts in conjunction with a spring exerting a pressure of about eighteen pounds equivalent in fluid pressure for the purpose of closing the release valve a chosen interval of time after the brake valve handle is so positioned to prevent dissipation of brake applying fluid in case the brake pipe pressure is reduced to cause supply of such fluid to apply the locomotive brakes. The spring, just mentioned, it will be noted, requires that the pressure of fluid on the diaphragm be increased to about one hundred twenty-two pounds to close the release valve when the pressure of fluid in the main reservoir is one hundred forty pounds. It is possible in a multiple unit locomotive that leakage of fluid under pressure from the application and release pipe, particularly at couplings between the units, may be such that the one hundred twenty-two pounds pressure can not be obtained in which case brake applying fluid supplied in response to a reduction in brake pipe pressure would merely be dissipated past the open independent release valve to atmosphere and no brakes would be obtained on the locomotive. This is of course very undesirable and another object of the invention is therefore the provision of means for insuring at least a partial automatic application of brakes under the condition just set forth.

Other objects and advantages will become apparent from the following more detailed description of the invention.

In the accompanying drawings: Fig. 1 is a diagrammatic view of a portion of the 24RL locomotive brake equipment embodying the invention; Fig. 2 is a diagrammatic, development view of parts of an engineer's independent brake valve device shown in vertical section in Fig. 1; and Fig. 3 is a diagrammatic view of another embodiment of the invention.

*Description Figs. 1 and 2*

The fluid pressure brake equipment with which the invention is adapted to be associated may be like that disclosed in the instruction pamphlet above referred to, and also in part like that disclosed in Patent No. 2,464,977 issued on March 22, 1949, in view of which the following description of the equipment will be limited to only such parts and their operation as essential to a clear understanding of the invention.

As shown in the drawing, the reference numerals 1 and 2 designate, respectively, a brake pipe and an electro-pneumatic straight air control pipe adapted to extend through the several units of the locomotive for connection with corresponding pipes on a train of cars at either end of the locomotive, depending upon which end is the leading end. An automatic brake valve device (not shown) adapted to be carried by each of the A units and to be connected to the brake pipe 1 is operable in the usual manner to effect a reduction in pressure of fluid in said brake pipe and to also recharge said brake pipe with fluid under pressure. The automatic brake valve device is also operative to supply and release fluid under pressure to and from the straight air pipe 2.

Each of the locomotive units is adapted to be provided with a brake controlling valve device 3 adapted to respond to a reduction in pressure of fluid in brake pipe 1 for supplying fluid under pressure to a passage 4 from which it is adapted to flow past the lower end of a double check valve 5 to a passage 6 and thence past the lower end of a double check valve 7 to an annular cavity 29 encircling the check valve 7 and from said cavity through a passage 8 to a relay valve device 9 which is adapted to respond to such pressure to provide from a pipe 10 fluid at a corresponding pressure in a brake cylinder device 11 for applying the brakes on the locomotive unit. The pipe 10 is adapted to be constantly supplied with fluid under pressure from the usual main reservoir pipe (not shown) extending through the locomotive. The brake controlling valve device 3 is adapted to operate in response to recharging of the brake pipe 1 with fluid under pressure to release fluid under pressure from the relay valve device 9 by reverse flow through the communication just described for thereby effecting a release of fluid under pressure from the brake cylinder device 11 and thereby a release of brakes on the locomotive.

Associated with the brake controlling valve device 3 on each unit of the locomotive is an interlock valve device 12 comprising, in addition to the double check valves 5 and 7, a selector valve device 13 and an independent brake release valve device 14.

Each selector valve device 13 comprises a piston 15 open at one side to a chamber 16 in constant communication with atmosphere through a vent port 17 and open at the opposite side to a valve chamber 18 adapted to be constantly supplied through passage 19 with fluid under pressure from the usual main reservoir (not shown) on the locomotive. A slide valve 21 contained in chamber 18 is connected by a stem 22 to the piston 15 for movement therewith. The selector valve device further comprises a piston 23 of greater area than and arranged in coaxial relation to the piston 15 and subject on one side to atmospheric pressure in chamber 16 and on the opposite side to pressure of fluid in a chamber 24.

When chamber 24 is vented pressure of fluid in chamber 18 will move the piston 15 and thereby the slide valve 21 to a lower or normal position in which they are shown in the drawing. When fluid under pressure is supplied to chamber 24, piston 23 being of greater area than piston 15 will move against and then actuate piston 15 and the slide valve 21 to an upper or independent brake release position.

In the normal position of slide valve 21 a cavity 25 therein opens the straight air pipe 2 to a passage 26 leading to the upper end of the double check valve 5 whereby when fluid under pressure is supplied to said straight air pipe with said slide valve in normal position such fluid will become effective on the upper end of the double check valve 5 and move it to its lower position so as to permit flow to passage 6 and thence to the lower end of the double check valve 7 for moving it to its upper position and then flow to passage 8 and thence to the relay valve device 9 for actuating same to supply fluid at a corresponding pressure to the brake cylinder device 11 for effecting an electro-pneumatic straight air application of brakes on the locomotive unit. Upon release of fluid under pressure from the straight air pipe 2, by reverse flow fluid will be released from the relay valve device 9 which will operate to effect a like release of fluid under pressure from the brake cylinder device 11 for releasing an electro-pneumatic straight air application of brakes on the locomotive.

The independent release valve device 14 comprises a check valve 27 contained in a chamber 28 which is constantly open through the annular chamber 29 encircling the double check valve 7 to passage 8 and thereby to the relay valve device 9. The check valve 27 is arranged to cooperate with a seat 30 for closing communication between chamber 28 and a release port 31, a spring 32 contained in chamber 28 acting on said check valve for urging it into contact with said seat. A stem 33 provided for engagement with the seating side of check valve 27 extends through passage 31 and a casing bore, in slidable contact therewith, into a chamber 34 where it is provided with a follower head 35 engaging one side of a flexible diaphragm 36. At one side of diaphragm 36 is the chamber 34 while at the opposite side is a chamber 37 connected by a passage 38 to the seat of the selector slide valve 21. Chamber 34 at the opposite side of diaphragm is, according to the invention, constantly open to atmosphere through a port 126.

According to the invention I mount on the release valve device 14 a release control valve device 115 having a chamber 116 open to a passage 117 which registers with the passage 31 and containing a release valve 118 arranged to cooperate with a seat in the casing to control communication between said chamber and atmosphere via a passage 119. The valve 118 is provided on one end of a stem 120 the opposite end of which is connected to a movable abutment preferably in the form of two pistons 121 which are slidably mounted in the casing with one subject on its outer face to pressure of fluid in chamber 116 while the opposite face of the other is open to a chamber 122. Between the two pistons there is formed a chamber 123 in constant communication with atmosphere via a passage 124. The chamber 122 is open to one end of a pipe 125 the opposite end of which, according to the invention, is connected to a passage 39 in the independent release valve device which passage is connected through a choke 40 to passage 38 and also directly to the seat of the selector slide valve 21. Heretofore the passage 39 was connected to chamber 34 in the release valve device 13 and passage 126 therein was not present.

In the normal position of the selector slide valve 21 a cavity 41 therein opens passage 38 and thereby diaphragm chamber 37 in the release valve device 13 to an atmospheric port 42 for equalizing the opposing fluid pressures on diaphragm 36 whereupon a spring 43, acting on said diaphragm with a force equivalent to about eighteen pounds fluid pressure on the diaphragm, will deflect said diaphragm to a position to permit closing of the valve 27 by spring 32. When the passage 38 is thus vented, the passage 39, which is lapped by the selector slide valve 21 in normal position is also vented through the choke 40 and passage 38 so that piston chamber 122 in the release control valve device 115 is also vented as a result of which a light bias spring 127 in chamber 116 will move the pistons 122 to the position in which they are shown in the drawing for opening the release valve 118.

With the check valve 27 seated as just described, fluid under pressure supplied to passage 8 and thereby to the check valve chamber 28 either by operation of the brake controlling valve device 3 or from the straight air pipe 2 will be held against dissipation to passage 31 so that it may become effective in the relay valve device 9 to cause an application of brakes on the locomotive unit.

When by operation of piston 23 in response to supply of fluid under pressure to chamber 24 the selector slide valve 21 is moved out of its normal position, in which it is shown in the drawing, to its brake release position a port 45 in said slide valve will move into registry with passage 38 and open said passage to valve chamber 18. As a result, fluid at main reservoir pressure in valve chamber 18 will promptly equalize into passage 38 and diaphragm chamber 37 and when such pressure becomes increased to a degree sufficient to overcome the opposing pressures of atmosphere and spring 43 in chamber 34, the diaphragm 36 will deflect and open the check valve 27. With the fluid pressure brakes on the locomotive unit applied by fluid under pressure from either the brake controlling valve device 3 or the straight air pipe 2 as above described, the unseating of check valve 27 will allow the actuating fluid pressure in the relay valve device 9 to be vented past said check valve to chamber 116 in the release control valve device 115 and thence past the release valve 118 therein, when open, to release the fluid under pressure from the brake cylinder device 11 for releasing the brakes on the locomotive unit.

When fluid at main reservoir pressure is supplied from the selector valve chamber 18 to passage 38 as above described, a portion of this fluid will flow through choke 40 into passage 39 which with the selector slide valve 21 in its brake release position is open through a cavity 46 therein to a passage 47 connected to an application and release pipe 48 extending through the locomotive and which may be vented as will be later described. As a result piston chamber 122 in the release control valve device 115 will also be vented to permit spring 127 to hold the release valve 118 open to permit a release of brakes, as above described.

The straight air pipe 2 is open through cavity 25 in the selector slide valve 21 to passage 26 when said slide valve is in normal position to permit control of brakes on the locomotive from said pipe as above described, but this communication is closed in the brake release position of said slide valve to prevent control of the locomotive brakes from said pipe.

From the above remarks, it will now be seen that either an automatic application of brakes on the locomotive effected in response to a reduction in pressure in brake pipe 1 and consequent operation of the brake controlling valve device 3 or a straight air application of brakes effected by fluid under pressure from the straight air pipe 2, may be released independently of the brake pipe or straight air pipe and hence independently of brakes on cars of a train by supplying fluid under pressure to piston chamber 24 of the selector valve device 13.

An actuating pipe 49, as well as the application and release pipe 48, are adapted to extend through the several units of the locomotive and on each of the A units both of said pipes are adapted to be connected through a cut-out valve 51 to an engineer's independent brake valve device 52.

The independent brake valve device 52 comprises an engineer's control handle 53 operable through the medium of a shaft 54 and a cam 55 thereon to control operation of a self-lapping valve mechanism 56 in an application and release zone (Fig. 2), and through the medim of another cam 57 to effect opening of a cut-off valve 58 in said zone and to permit closing of said valve by a spring 60 upon movement of said handle to a locking position (Fig. 2). The handle is also depressible against a spring pressed plunger 61 carried by shaft 54 for operating an independent release valve mechanism 62.

The self-lapping valve mechanism 56 comprises a plunger 63 slidably mounted in the casing with one end engaging the cam 65, and fulcrumed intermediate its ends on a pin 64 carried by said plunger is an equalizing lever 65. One end of lever 65 is connected to a pin 66 which engages a fluid pressure supply valve 67 contained in a chamber 68 which is constantly supplied with fluid under pressure from a fluid pressure supply pipe and passage 69 adapted to be constantly open to the main reservoir pipe (not shown) on the unit. A spring 70 in chamber 68 acts on the supply valve 67 for urging it to a closed position in which it is shown in the drawing. The opposite end of lever 65 carries a roller 71 bearing against the end of a stem of a release valve 72 carried by a piston 73 and arranged to cooperate with a seat on said piston for controlling communication between a chamber 74 at one side of said piston and a chamber 75 at the opposite side which latter chamber is open to atmosphere through a vent port 76. A control spring 77 in chamber 75 acts on piston 73 for opposing pressure of fluid in chamber 74 acting on said piston. A spring 78 acts on the stem of the release valve 72 for urging said valve out of contact with its seat on piston 73.

With the brake valve handle 53 in its release position, in which it is shown in the drawing, the cam 55 permits the plunger 63 to be so positioned as to permit closing of the supply valve 67 by spring 70, and full extension of the spring 77 and thereby opening of the release valve 72 by spring 78. The cam 55 is so designed that upon movement of the handle 53 from release position into its application and release zone the plunger 63 will be displaced in the direction of the right hand an extent proportional to the degree of such movement. As the handle 53 is thus turned into the application and release zone the plunger 63 will therefore be operated to initially seat the release valve 72 on piston 73 and then the lever 65, turning about its connection with the end of the release valve stem, will unseat the supply valve 67 to permit flow of fluid under pressure from chamber 68 to chamber 74 and thence past the open cut-off valve 58 to the application and release pipe 48. As fluid under pressure is thus supplied to chamber 74, such pressure acting on piston 73 will move said piston against spring 77 according to the increase in such pressure.

Assuming that movement of handle 73 is stopped in some intermediate position in the application and release zone, then fluid will continue to flow to chamber 74 and application and release pipe 48 until the movement of piston 73, with the exhaust valve 72 seated, permits such rocking of lever 65 as to permit closing of the supply valve 67 by spring 70 to prevent further supply of fluid under pressure to said chamber and pipe and thereby limiting the pressure of such fluid in accordance with the position of handle 53 in the application and release zone. If the handle 53 is moved further away from release position the self-lapping valve mechanism 56 will operate to effect a corresponding increase in pressure in chamber 74 and in the application and release pipe 48, a maximum pressure such as forty-five pounds being obtained in said chamber and pipe with said handle in its most remote position from the release position. If the handle is moved back toward release position the supply valve 67 will remain seated and permit spring 78 to open the exhaust valve 72 for thereby releasing fluid under pressure from chamber 74. As the pressure of fluid in chamber 74 is thus released on the one side of piston 73 spring 77 will move said piston in the direction of the release valve 72. If handle 53 is stopped short of release position, thereby fixing the position of the release valve 72, the pressure of fluid in chamber 74 will continue to reduce until piston 73 engages said release valve for preventing further release of such fluid pressure to thereby limit the reduction in the pressure of such fluid in accordance with the new position of the handle 53. Upon the return of handle 53 to its release position the valve 72 will still be open when movement of piston 53 by spring 77 ceases to permit full release of fluid under pressure from chamber 74. It will thus be seen that the self-lapping valve mechanism 56 will provide in chamber 74 and thereby in the application and release pipe 48, when the cut-off valve 58 is open, fluid at a pressure corresponding to the position of said handle out of release position and permit such pressure to reduce to that of atmosphere in release position.

The independent release valve mechanism 62 comprises, for illustration, two oppositely seated valves 79 and 80 contained, respectively, in chambers 81 and 82 and having fluted stems extending in the direction of each other through suitable bores in the casing and meeting in an intermediate chamber 83. The chamber 81 is adapted to be constantly supplied with fluid under pressure from the fluid pressure supply pipe 69. The chamber 82 is open to atmosphere through a vent port 84 while chamber 83 is open to the actuating pipe 49 through a passage 85. A spring 86 contained in chamber 81 acts on the valve 79 for urging it to its closed position and at the same time opening the valve 80. Slidably mounted in the casing above valve 80 is a plunger 87 one end of which engages the valve 80 while the opposite end is disposed outside of the casing of the brake valve device where it is arranged for engagement by a vertically movable bail 88 fulcrumed at the opposite side of shaft 54 on a pin 89. The bail 98 is disposed beneath the brake valve handle 53 for engagement thereby, whereby upon depression of said handle from its normal elevated position it will engage said bail and actuate the plunger 87 to seat valve 80 and open valve 79. The bail 88 may thus be operated by handle 53 in release position of said handle, as well as in the application and release zone, and while depressed it may be moved to a locking position (Fig. 2) under a lip 90 and then be relieved of manual pressure whereupon said lip will hold said handle in its depressed position for holding the valve 80 closed and valve 79 open.

By moving handle 53 out of release position into the application and release zone, fluid at a corresponding pressure will be provided in the application and release pipe 48 as above described. When the brakes on the locomotive are released, such fluid will flow through cavity 46 in the slide valve 21 to the upper end of the double check valve 7 and thence through passage 8 to the relay valve device 9 for effecting an independent application of brakes on the locomotive. By return of the handle 53 to its release position, such an application of brakes may be released by reverse flow of fluid through the communication, just described, as will be apparent.

If the brake valve handle 53 is depressed in its release position in which the application and release pipe 48 is vented, the independent release valve mechanism 62 will be operated to supply fluid under pressure to the actuating pipe 49 and thus to piston chamber 24 in the selector valve device 13 to actuate said selector valve device to its independent release position for venting chamber 122 in the release control valve device 115 to the vented application and release pipe 48 so that the release valve 118 will be opened by spring 127 and also for causing operation of the independent release valve device 14 to effect, via the open release valve 118, a release of brakes on the locomotive applied by operation of the brake controlling valve device 3 or by fluid from the straight air pipe 2. If the handle 53 is allowed to return to its upper position fluid under pressure will be vented from the piston chamber 24 in the selector valve device 13 past the open valve 80 in the brake valve device whereupon the parts of the selector valve device will return to normal position in which they are shown in the drawing. If the brake application released by depression of the brake valve handle 53 was a result of fluid under pressure present in the straight air pipe 2 the brakes will be automatically reapplied upon return of the brake valve handle 53 to its upper position by fluid under pressure from said pipe flowing through cavity 25 in the selector slide valve 21. In order to prevent such reapplication of the brakes on the locomotive unit by fluid under pressure from the straight air pipe 2 or to prevent all application of brakes on the unit by fluid under pressure from said pipe the handle 53 may be moved to its locking position for thereby, without manual pressure on the handle, maintaining the independent release portion 62 of the brake valve device in the position for supplying fluid under pressure to chamber 24 of the interlock valve device 13 whereby the selector slide valve 21 will be held in its upper position for disconnecting the straight air pipe from passage 26 and for supplying fluid under pressure to chamber 37 in the independent release valve device 14 to hold the check valve 27 open and through the choked communication 48 to chamber 122 in the release control valve device 115 and to the application and release pipe 48. In locking position of the independent brake valve handle 53 the cut-off valve 58 in the brake valve device is closed so that through the choked communication 49 the pressure of fluid in the application and release pipe 48 and in piston chamber 122 of the release control valve device 115 will normally substantially equalize with the main reservoir pressure in the selector valve chamber 18 and hold the release control valve 118 closed. With the independent release valve 118 thus closed if, due to a reduction in pressure in brake pipe 1 the brake controlling valve device 3 on the unit should operate to supply fluid under pressure to passage 4, such fluid will become effective in the relay valve device 9 to cause an application of brakes on the locomotive unit, it being desired to point out, however, that the obtaining of such an application of brakes is dependent upon the independent release valve 118 being closed as just mentioned.

With chamber 122 in the release control valve device 115 supplied with fluid at main reservoir pressure, as just described, and which will always exceed any brake applying pressure which may be obtained in chamber 116, it will be noted that any leakage of fluid from chamber 122 past the lower piston 121 will be vented to atmosphere through chamber 123 and port 124 to prevent such leakage influencing the pressure in chamber 116.

If when the engineer depresses the brake valve handle 53 to effect a release of brakes on the locomotive caused by operation of the brake controlling valve device 3 or by pressure of fluid from the straight air pipe 2 he also moves said handle to its locking position for closing the cut-off valve 58, the application and release pipe 48 and chamber 122 under the piston 121 of the release control valve device 115 will promptly start to be charged with fluid under pressure through the choked communication 40. The flow capacity of this choked communication is, however, such that insufficient pressure will be obtained in the application and release pipe and piston chamber 122 of the release control device 115 to move the piston 121 against the bias spring 127 to close the release valve 118 for a time period adequate to insure a complete release of the brake application. If the flow capacity of the choked communication 40 were greater, then the independent release valve 118 might close before a complete release of the application of brakes on the locomotive unit occurred while, if less, the closing of said release valve would be unduly delayed and it possibly might be open at a time when the brake controlling valve device 3 operated to supply fluid under pressure for effecting an application of brakes and permit dissipation of such fluid without obtaining such application. In case the brake valve handle 53 were merely depressed in its release position for effecting release of an application of brakes on the locomotive and in which position the application and release pipe 48 is open to atmosphere past the open cut-off valve 58 and the self-lapping valve mechanism 56 in said brake valve device, fluid under pressure flowing through the choked communication 40 to said pipe is vented to atmosphere so that it would be undesirable to have said communication of any greater capacity than necessary to accomplish the desired result.

Now let it be assumed that the independent brake valve handle 53 is in its elevated release position and that either by operation of the brake controlling valve device 3 or by fluid under pressure from the straight air pipe 2, the brakes on the locomotive are applied along with those on a connected train and that it is desired to reduce the degree of brake application on the locomotive without effect upon the brakes on the train.

To accomplish this the independent brake valve handle 53 will be depressed and at the same time be moved into the application and release zone for supplying fluid to the application and release pipe 48 at a pressure corresponding to the reduced degree of brake application which it is desired to retain on the locomotive. In response to depressing of the brake valve handle 53 the selector slide valve 21 will move to its brake release position for causing opening of the release check valve 27 to open the relay valve device 9 to chamber 116 in the release control valve device 115 and for also opening the application and release pipe 48 to chamber 122 in said device. The pistons 121 in the release control device 115 will hence be subject in chamber 122 to fluid at the pressure which it is desired to retain in the relay valve device 9 and brake cylinder device 11 and in chamber 116 to the higher pressure in said relay valve which higher pressure plus the slight force of bias spring 127 will open the release valve 118 for releasing fluid under pressure from the relay valve device 9 to reduce the degree of brake application on the locomotive. Fluid under pressure will thus continue to release from the relay valve device and chamber 116 in the release control valve device 115 until the pressure of such fluid becomes reduced sufficiently below that in chamber 122 to permit the latter pressure to operate pistons 121 to close the release valve 118 and prevent further release of fluid under pressure from the relay valve device 9 and brake cylinder device 11 thereby limiting the reduction in such pressure and in the degree of brake application on the locomotive according to the preselected position of the brake valve handle 53 in the application and release zone. It is to be noted in the operation just described that the degree of brake application is merely reduced to that preselected by the depressed position of the brake valve handle 53 in the application and release zone and hence any desired degree may be retained by the proper positioning of said handle in said zone. If the degree of brake application retained is still greater than desired a further reduction may be effected by moving the handle, still depressed, toward the release position for reducing the pressure in the application and release pipe 48 and hence piston chamber 122 of the release control valve device 115 whereupon said device will again operate in the same manner as above described to effect a corresponding reduction in operating pressure in the relay valve device 9 and hence brake cylinder device 11 and thereby a like reduction in the degree of brake application of the locomotive.

On the other hand if the operator should desire to reapply the brakes on the locomotive to a greater degree he may permit the handle 53 to return to its elevated position in which the selector slide valve 21 will return to its lower position. If the brake application on the locomotive was initially as a result of operation of the brake controlling valve device 3, which will now be in lap position, the handle 53 may be turned into the application and release zone to increase the pressure in the application and release pipe 48, which now is opened through the selector slide valve 21 to the relay valve device 9, to cause operation of said relay valve device to provide the desired increase in brake application. However, if the initial brake application were a result of fluid under pressure from the straight air pipe 2 then upon release of the handle 53 and return of the selector slide valve 21 to its lower position the brakes on the locomotive will be reapplied according to the pressure in the straight air pipe, and if such application is excessive, it may be promptly reduced by again depressing the handle 53 and at the same time moving it into the application and release zone to a position corresponding to the degree of brake application desired, in which case the release control valve 115 will again operate in the same manner as above described.

When the independent brake valve handle 53 is in locking position for holding the selector slide valve 21 in its upper position to close communication from the straight air pipe 2 to passage 26 for preventing straight air application of locomotive brakes by fluid under pressure from said pipe, it is desirable that the brakes on the locomotive apply upon operation of the brake controlling valve device 3 in response to an emergency reduction in pressure in the brake pipe 1. To accomplish this the cut-off valve 58 in the brake valve device is closed so that the application and release pipe 48 and connected chamber 122 in the release control valve device 115 may become charged with fluid from the main reservoir (at, for example, one hundred and forty pounds) through the choke 40 whereby the pistons 121 will hold the release control valve 118 seated against pressure of brake applying fluid at around sixty-five pounds which may become effective in chamber 116.

At pipe joints, hose couplings, etc. in air pipe, such as the application and release pipe 48, there is usually some leakage so that the supply of fluid from the main reservoir to said pipe via choke 40 may not provide fluid in said pipe at main reservoir pressure. According to the invention, however, the leakage from the application and release pipe may be so great that even if only sixty-five pounds can be obtained therein through the choke 40 it will be sufficient to ensure a full emergency application of brakes since the pressure in said pipe must be less than around sixty-five pounds to permit the release control device 115 to be operated by brake applying fluid in chamber 116 to release any of such fluid. With reasonable leakage of fluid under pressure from the application and release pipe 48, therefore, substantially a full application of brakes will be assured under the condition in question.

In the structure above described it will be noted that the release valve device 14 is ahead of the release control valve device 115; that is, the release of fluid under pressure from the relay valve device 9 occurs first through the release valve device 14 and then through the release control valve device 115, this arrangement being particularly adapted for modifying 24RL brake equipment already in use since to modify the equipment all that is necessary is to mount the release control valve device 115 on the release valve device 14, open chamber 34 to atmosphere and apply the pipe 125, as shown in the drawing and above described.

*Description—Fig. 3*

If desired, however, the release valve device 14 may be arranged to control release of fluid under pressure from the relay valve device 9 after such fluid has first passed through a release control valve device by the structure shown in Fig. 3 wherein the release control valve device is designated by the numeral 130.

The release control valve device 130 comprises two coaxially arranged pistons 131, 132 spaced apart by a connecting stem 133 and mounted to slide in a common bore in the casing. At the lower face of piston 132 is a chamber 134 open to passage 39. At the opposite face of piston 131 is a chamber 135 open to the annular chamber 29 encircling the double check valve 7 and hence constantly open to the relay valve device 9. A passage 136 is open at one end to the wall of the bore in which the piston 131 operates at such a point as to be open to chamber 135 when the two pistons are in a lower position, in which they are shown in the drawing, and to be disconnected from said chamber and open to a chamber 136a between the pistons in an upper position of said pistons which is defined by engagement with a lug 137 projecting into chamber 135. A light bias spring 138 in chamber 135 acts on the pistons 131, 132 to urge them to their lower position. The other end of passage 136 is open to the check valve chamber 28 in the release valve device 14 and passage 31 therein is open directly to atmosphere. Chamber 34 in the release valve device 14 is open directly to atmosphere through passage 126 and chamber 37 in said device is open to passage 38, the same as in the structure shown in Fig. 1.

In passage 38 there is disposed a check valve 139 and by-passing said check valve is a communication containing a choke 140, the check valve being arranged to permit prompt flow of fluid under pressure through said passage to chamber 37 in the release valve device 14 and the choke providing for restricted flow in the opposite direction.

Ahead of the check valve 139 the passage 136 is open through a choke 141 and a by-pass communication containing a check valve 142 to passage 39 the choke being arranged to limit flow of fluid under pressure from passage 38 to passage 39 and the communication containing said check valve being of greater flow capacity than said choke for flow of fluid under pressure from passage 39 to passage 38.

In operation, when the brake valve handle 53 is in its elevated position and the slide valve 21 of the selector valve device 13 in its lower position, chamber 37 in the release valve device 14 will be vented to permit closure of the check valve 27 to present dissipation of fluid under pressure supplied to operate the relay valve device 9 from the straight air pipe 2 or by operation of the brake controlling valve device 3 or independent brake valve device 52. Chamber 134 below the piston 132 will be vented to atmosphere via passage 39, past the check valve 142 and through passage 38 which will permit spring 138 and pressure of brake applying fluid from the relay valve device 7 present in chamber 135 to hold the pistons 131, 132 in their lower position opening chamber 135 to passage 136 and hence to the check valve chamber 28.

If the brakes on the locomotive are applied either by fluid under pressure from the straight air pipe 2 or by operation of the brake controlling valve device 3 and the operator desires to partly reduce the degree of braking without effect upon the degree of braking on cars of a connected train, he will depress the brake valve handle 53 and at the same time move it into the application and release zone to a position corresponding to the degree of brake application which he desires to retain. In the application and release zone the application and release pipe 48 will be charged with fluid at the pressure corresponding to the position of handle 53 and the depression of said handle will cause the selector slide valve 21 to move to its upper position.

In the upper position of the selector slide valve 21 fluid at main reservoir pressure will be promptly supplied through passage 38 past the check valve 139 therein to chamber 37 of the release valve device 14 which will be operated to open the check valve 27 and initiate a release of fluid under pressure from the relay valve device 7 for effecting release of the locomotive brakes. At the same time the application and release pipe 48 will be opened through passage 47 and cavity 46 in the selector slide valve 21 to passage 39 so that fluid will be supplied to piston chamber 134 from said pipe and also from passage 38 through choke 141 thereby increasing the pressure in said chamber to the degree called for by the position of the brake valve handle 53, the self-lapping portion 56 of the brake valve device limiting such pressure to said degree in the usual manner.

The pressure of fluid thus provided in chamber 134 initially is less than the opposing pressure from the relay valve device 9 present in chamber 135 so that the pistons 131, 132 will remain in their lower position permitting release of fluid under pressure from the relay valve device past the check valve 27 until the pressure in chamber 135 becomes sufficiently reduced for that in chamber 134 to move said pistons to their upper position. Upon movement to their upper position piston 131 closes communication between chamber 135 and passage 136 for preventing further release of fluid under pressure from the relay valve device 9 thereby limiting the reduction in pressure therein in accordance with the pressure of fluid in chamber 134 and the position of the brake valve handle.

If a complete independent release of the locomotive brakes is desired the handle will be depressed in its release position in which no fluid under pressure will be provided in chamber 134 of the release control valve device 130 since the application and release pipe 48 is opened to atmosphere past the open cut-off valve 58 in the brake valve device 52 and the self-lapping portion 56 thereof. As a result the pistons 131, 132 will remain in their lower position to permit complete release of brake applying fluid past the open check valve 27.

If the operator not only desires to effect a complete release of locomotive brakes but also to prevent a reapplication thereof by fluid under pressure from the straight air pipe during electro-pneumatic control of brakes he will depress the handle 53 and move it into locking position. Under this condition the brakes will release the same as described in the preceding paragraph, but with the cut-off valve 58 in the brake valve device closed, pressure of fluid will gradually increase in the application and release pipe 48 and piston chamber 134 by the supply through choke 141 until, after a time period sufficient to ensure a complete release of brakes, sufficient pressure will be obtained in chamber 134 to move the pistons 131, 132 to their upper position for closing communication between chamber 135 and passage 136 and in which chamber 136a between said pistons will be vented through passage 136 and the open valve 27. With this communication closed by piston 131 if an emergency reduction in pressure should for any reason occur in the brake pipe 1, fluid under pressure supplied by the brake controlling valve device 3 to apply the brakes in the emergency will not be dissipated past the open check valve 27.

In a multiple unit locomotive when the brake valve handle 53 on the locomotive is depressed in release position for releasing an application of brakes on the locomotive fluid under pressure will be supplied to the application and release pipe 48 throughout the locomotive via choke 141 on each of the units and even though said pipe is open to atmosphere at the brake valve device a certain pressure will build up in said pipe toward the rear of the locomotive and therefore in piston chamber 134 of the respective brake release control valve device or devices 130 which would operate to limit correspondingly the degree of brake release on the respective unit or units. At the termination of a brake release operation if the operator should permit the handle to return to its elevated position the selector valve devices on the locomotive will return to their lower position for promptly venting past the check valves 142 the fluid under pressure from the piston chambers 134 so that the pistons 131, 132 will move promptly to their lower position, if not already there. The closing of the check valves 27 is however delayed by choke 140 restricting release of fluid under pressure from diaphragm chamber 37 to such an extent that movement of pistons 131, 132 to their lower position will first occur so as to ensure complete release of brakes under a condition such as just described. While not shown in the drawing, the check valve 139 and choke 140 could be advantageously employed in the structure shown in Fig. 1 for the same purpose.

The pistons 131, 132 of the release control valve device 130 are controlled by the opposing pressures acting in the relay valve device 9 and in the application and release pipe 48 when the selector slide valve 21 is in its upper position, like the release control valve device 115 in the structure shown in Fig. 1, so as to ensure at least a partial application of brakes with reasonable leakage of fluid under pressure from the application and release pipe 48 when the brake valve handle 53 is in locking position and the brake controlling valve device 3 operates in response to an emergency reduction to brake pipe pressure to supply fluid under pressure to operate the relay valve device 9.

*Summary*

From the above description it will now be seen that I have provided means for modifying the No. 24RL locomotive brake equipment which will permit the release of an application of brakes on the locomotive independently of the brakes on a connected train down to a partial selected degree without having to first effect a complete release followed by a reapplication to said desired degree and which also ensures a partial automatic emergency application of the brakes on the locomotive in case of leakage of fluid under pressure from the application and release pipe thereon.

Having now described my invention, what I claim as new and desire to secure by Letters Patent, is:

1. In a fluid pressure brake equipment, in combination, fluid pressure operable brake applying means, means for supplying fluid under pressure to operate said brake applying means, brake release control means controlled by opposing pressures of fluid from said brake applying means and in a chamber and operative upon a preponderance in the former to reduce same to substantially that in said chamber, a self-lapping brake valve device comprising a handle which is manually depressible and which has an application and release zone and which is operative by said handle in said zone to supply fluid at a pressure corresponding to the position of said handle in said zone, and means responsive to depression of said handle to supply fluid at the pressure provided by said brake valve device to said chamber, and operative upon relief of manual pressure on said handle to close the fluid pressure release communication from said brake applying means through said brake release control means.

2. In a fluid pressure brake equipment, in combination, brake applying means operable by fluid under pressure to effect an application of brakes, means for supplying fluid under pressure to said brake applying means, a self-lapping brake valve device comprising a handle having an application and release zone of movement for operating said brake valve device to supply fluid at a pressure corresponding to the position of said handle in said zone, brake release means controlled by opposing pressures of fluid in first and second chambers and operative by a preponderance in pressure in said first chamber to reduce such pressure to substantial equalization with that in said second chamber, means controlled by said handle regardless of its position in said zone to selectively connect and disconnect said brake applying means to and from said first chamber, and means for opening said second chamber to said brake valve device to receive fluid under pressure supplied thereby upon connecting said brake applying means to said first chamber.

3. In a fluid pressure brake equipment, in combination, brake applying means operable by fluid under pressure to apply brakes, brake controlling means for supplying fluid under pressure to said brake applying means, a brake control pipe, release control means adapted to be controlled by fluid under pressure from said brake applying means opposing pressure of fluid from said pipe and operable to reduce the pressure of fluid in said brake applying means to substantial equalization with pressure of fluid in said pipe, selector means having a brake release position for rendering said release control means effective to reduce pressure of operating fluid in said brake applying means and having a normal position for rendering said release control means ineffective to reduce pressure of fluid in said brake applying means, and an operator's brake valve device for selectively positioning said selector means and for supplying fluid under pressure to said pipe.

4. In a fluid pressure brake equipment, in combination, fluid pressure operable brake applying means, means for supplying fluid under pressure to operate said brake applying means, brake release control means adapted to be controlled by opposing pressures of fluid from said brake applying means and in a chamber and operative upon a preponderance in the former for opening a communication to reduce the pressure of fluid in said brake applying means to substantially that in said chamber, a self-lapping brake valve device comprising a handle which is manually depressible and which has an application and release zone and which is operative by said handle in said zone to supply fluid at a pressure corresponding to the position of said handle in said zone, selector means operable upon supply of fluid under pressure to another chamber to open the first named chamber to said brake valve device for charging with fluid under pressure supplied by said brake valve device and for also opening said communication, and operable upon venting said other chamber to close said communication and vent said first chamber, and means responsive to depression of said handle to supply fluid under pressure to said other chamber and responsive to relief of manual pressure on said handle to vent said other chamber.

5. In a fluid pressure brake equipment, in combination, fluid pressure operable brake applying means, means for supplying fluid under pressure to operate said brake applying means, brake release control means adapted to be controlled by opposing pressures of fluid from said brake applying means and in a chamber and operative upon a preponderance in the former to reduce same to substantially that in said chamber, a self-lapping brake valve device comprising a handle which is manually depressible and which has an application and release zone and which is operative by said handle in said zone to supply fluid at a pressure corresponding to the position of said handle in said zone, selector means cooperable with said brake release control means to control communication through which fluid under pressure is released by said release control means and operable upon supply of fluid under pressure to another chamber for opening said communication and operable upon venting said other chamber to close said communication, and means responsive to depression of said handle to supply fluid under pressure to said other chamber and responsive to relief of manual pressure on said handle to vent said other chamber.

6. In a fluid pressure brake equipment, in combination, fluid pressure operable brake applying means, means for supplying fluid under pressure to operate said brake applying means, brake release control means adapted to be controlled by opposing pressures of fluid from said brake applying means and in a chamber and operative upon a preponderance in the former to reduce same to substantially that in said chamber, a self-lapping brake valve device comprising a handle which is manually depressible and which has an application and release zone and which is operative by said handle in said zone to supply fluid at a pressure corresponding to the position of said handle in said zone, means responsive to depression of said handle to supply fluid at the pressure provided by said brake valve device to said chamber, a valve for controlling the communication through which fluid under pressure is released from said brake applying means by said brake release control means, and means responsive to depression of said handle to open said valve and responsive to relief of manual pressure on said handle to close said valve.

7. In a fluid pressure brake equipment, in combination, fluid pressure operable brake applying means, means for supplying fluid under pressure to said brake applying means, release control valve means arranged for control by opposing pressures of fluid from said brake applying means and in a first chamber for reducing the pressure of fluid in said brake applying means to substantially that in said chamber, brake release means cooperable with said valve means to control communication through which pressure is reduced in said brake applying means by operation of said release control valve means and operable by fluid under pressure in a second chamber to open said communication and operative upon release of fluid under pressure from said second chamber to close said communication, an application and release pipe, selector means operable upon supply of fluid under pressure to a third chamber to supply fluid under pressure to said second chamber and to open said first chamber to said pipe and operable upon release of fluid under pressure from said third chamber to vent fluid under pressure from said first and second chambers, and a brake valve device for selectively supplying fluid under pressure to and releasing fluid under pressure from said third chamber and for supplying fluid at various pressures to said application and release pipe while supplying fluid under pressure to said third chamber.

8. In a fluid pressure brake equipment, in combination, fluid pressure operable brake applying means, means for supplying fluid under pressure to said brake applying means, release control valve means arranged for control by opposing pressures of fluid from said brake applying means and in a first chamber for reducing the pressure of fluid in said brake applying means to substantially that in said chamber, brake release means operable by fluid under pressure in a second chamber to open the communication through which pressure is reduced in said brake applying means by operation of said release control valve means and operative upon release of fluid under pressure from said second chamber to close said communication, an application and release pipe, selector means operable upon supply of fluid under pressure to a third chamber to supply fluid under pressure to said second chamber and to open said first chamber to said pipe and operable upon release of fluid under pressure from said third chamber to vent fluid under pressure from said first and second chambers, means for restricting venting of fluid under pressure from said second chamber with respect to rate of venting of fluid under pressure from said first chamber but providing for a more rapid rate of supply to said second chamber than the rate of venting, and a brake valve device for selectively supplying fluid under pressure to and releasing fluid under pressure from said third chamber and for supplying fluid at various pressures to said application and release pipe while supplying fluid under pressure to said third chamber.

9. In a fluid pressure brake equipment, in combination, brake applying means operable by fluid under pressure to effect an application of brakes, a release control valve for releasing fluid under pressure from said brake applying means, movable abutment means adapted to be subjected to pressure of fluid from said brake applying means and opposing pressure of fluid in a chamber for operating said release control valve to reduce the pressure of fluid in said brake applying means to substantial equalization with pressure of fluid in said chamber, a pipe, selector means having a brake release position for opening communication through which fluid under pressure is released from said brake applying means by said release control valve and for opening a communication between said chamber and said pipe and having a normal position for closing said communications and for venting said chamber, and a brake valve device for selectively positioning said selector means and for supplying fluid at various pressures to said pipe.

10. In a fluid pressure brake equipment, in combination, brake applying means operable by fluid under pressure to effect an application of brakes, a release control valve for releasing fluid under pressure from said brake applying means, movable abutment means adapted to be subjected to pressure of fluid from said brake applying means and opposing pressure of fluid in a chamber for operating said release control valve to reduce the pressure of fluid in said brake applying means to substantial equalization with pressure of fluid in said chamber, selector means having a brake release position for opening communication through which fluid under pressure is released from said brake applying means by said release control valve and having a normal position for closing said communication, and a brake valve device for selectively positioning said selector means and for providing fluid under pressure in said chamber.

11. In a fluid pressure brake equipment, in combination, brake applying means operable by fluid under pressure to effect an application of brakes, a release control valve for releasing fluid under pressure from said brake applying means, movable abutment means adapted to be subjected to pressure of fluid from said brake applying means and opposing pressure of fluid in a chamber for operating said release control valve to reduce the pressure of fluid in said brake applying means to substantial equalization with pressure of fluid in said chamber, a valve for closing communication through which said release valve reduces the pressure in said brake applying means, movable abutment means operable by fluid under pressure in a second chamber to open said valve and upon venting said second chamber to effect closure of said valve, a pipe, selector means having a brake release position for supplying fluid under pressure to both of said chambers and for also opening the first named chamber to said pipe and having a normal position for venting both of said chambers, means for restricting the said supply of fluid under pressure to said first chamber and pipe in said brake release position of said selector means, and a brake valve device for selectively positioning said selector means and supplying fluid at various pressures to said pipe.

12. In a fluid pressure brake equipment, in combination, brake applying means operable by fluid under pressure to effect an application of brakes, a brake pipe, brake controlling means responsive to a reduction in pressure in said brake pipe to supply fluid under pressure to said brake applying means, release control means adapted to be controlled by opposing pressures of fluid from said brake applying means and in a chamber for reducing the pressure in said brake applying means to substantial equalization with that in said chamber, a brake control pipe, selector means having a brake release position for opening a communication between said chamber and said brake control pipe and at the same time opening a communication through which fluid pressure is reduced in said brake applying means by said release control means and for also supplying fluid under pressure to said chamber, and having a brake release position for closing said communications and venting fluid under pressure from said chamber, means for restricting supply of fluid under pressure to said chamber by operation of said selector means, and a brake valve device for controlling the position of said selector means and at the same time supplying fluid under pressure to said brake control pipe.

13. In a fluid pressure brake equipment, in combination, brake applying means operable by fluid under pressure to effect an application of brakes, a brake pipe, brake controlling means operable upon a reduction in pressure in said brake pipe to supply fluid under pressure to said brake applying means, a straight air pipe for conveying fluid under pressure to operate said brake applying means, an application and release pipe for conveying fluid under pressure to operate said brake applying means, selector means having a normal position opening communications to said straight air pipe and application and release pipe for rendering pressures of fluid therein effective in said brake applying means and having a brake release position for closing said communications, release control valve means adapted to be operated by pressure of fluid from said brake applying means to reduce such pressure to substantial equalization with an opposing fluid pressure in a chamber, said selector means in said brake release position opening a communication from said chamber to said application and release pipe and supplying fluid under pressure to both at a restricted rate and also effecting opening of a communication through which fluid under pressure is adapted to be released from said brake applying means by said release control valve and in said normal position closing said communications and venting said chamber, and an engineer's independent brake valve device for selectively positioning said selector means and for supplying fluid at various pressures to said application and release pipe and also operable to open said application and release pipe to atmosphere.

14. Means for modifying an automatic brake controlling valve device to provide for release of either an automatic or an electro-pneumatic straight air application of brakes to a degree corresponding to the position of a self-lapping brake valve device in an application and release zone, said brake controlling valve device comprising an interlock valve device through which the said application of brakes occurs and including brake release means responsive to supply of fluid under pressure to a chamber to open a passage in said brake controlling valve device, in which brake applying fluid is present, to a fluid pressure release passage, and selector means having a brake release position for supplying fluid under pressure to said chamber and to a control passage and having a normal position for venting fluid under pressure from said chamber and control passage, the first named means comprising a casing removably secured to said brake release means over said brake release passage and having a second chamber open to the last named passage, a release control valve in said second chamber controlling communication between said second chamber and atmosphere, movable abutment means in said casing subject to pressure of fluid in said second chamber and opposing pressure of fluid in a third chamber for operating said release control valve to reduce pressure of fluid in second chamber to substantial equalization with pressure of fluid in said third chamber, and a pipe connecting said casing to said interlock valve device opening said third chamber to said control passage.

ANDREW T. GORMAN.

References Cited in the file of this patent

UNITED STATES PATENTS

| Number | Name | Date |
|---|---|---|
| 1,801,859 | Good | Apr. 21, 1931 |
| 1,879,703 | McCune | Sept. 27, 1932 |
| 2,464,977 | Gorman | Mar. 22, 1949 |